United States Patent [19]

Salmon

[11] Patent Number: 4,700,962
[45] Date of Patent: Oct. 20, 1987

[54] ROWING TYPE VEHICLE
[75] Inventor: James R. Salmon, Fresno, Calif.
[73] Assignee: Rowcycle, Fresno, Calif.
[21] Appl. No.: 871,283
[22] Filed: Jun. 6, 1986
[51] Int. Cl.⁴ .......................... B62M 1/06; B62M 1/14
[52] U.S. Cl. ...................................... 280/220; 272/72; 272/73; 280/246; 280/255; 280/266; 280/270; 280/281 LP
[58] Field of Search ............... 280/220, 210, 240, 242, 280/235, 251, 253; 280/244, 246, 255, 263, 266, 270, 274, 281 LP, 111, 112 A; 272/33 B, 72, 73

[56] References Cited
U.S. PATENT DOCUMENTS

| | | | |
|---|---|---|---|
| 642,544 | 1/1900 | Burbank | 280/220 |
| 3,888,512 | 6/1975 | Peterson | 280/255 |
| 4,432,561 | 2/1984 | Feikema | 280/266 |
| 4,572,535 | 2/1986 | Stewart | 280/266 |

FOREIGN PATENT DOCUMENTS 531652  1/1922  France ................................ 280/255

Primary Examiner—David M. Mitchell
Assistant Examiner—Everett G. Diederiks, Jr.
Attorney, Agent, or Firm—Robert B. Chickering; Glen R. Grunewald

[57] ABSTRACT

A manually operated vehicle propelled by motion simulating rowing, the vehicle having a frame with drive wheels and a steering wheel and with a seat mounted between the drive wheels on a rail that rotates around its long axis and is connected to the steering wheel so that rotation of the rail causes steering movements of the steering wheel. The handle assemblies are moved to affect rowing motion and they have adjustable length to provide either greater torque or greater speed from the same rowing motion.

11 Claims, 7 Drawing Figures

FIG—1

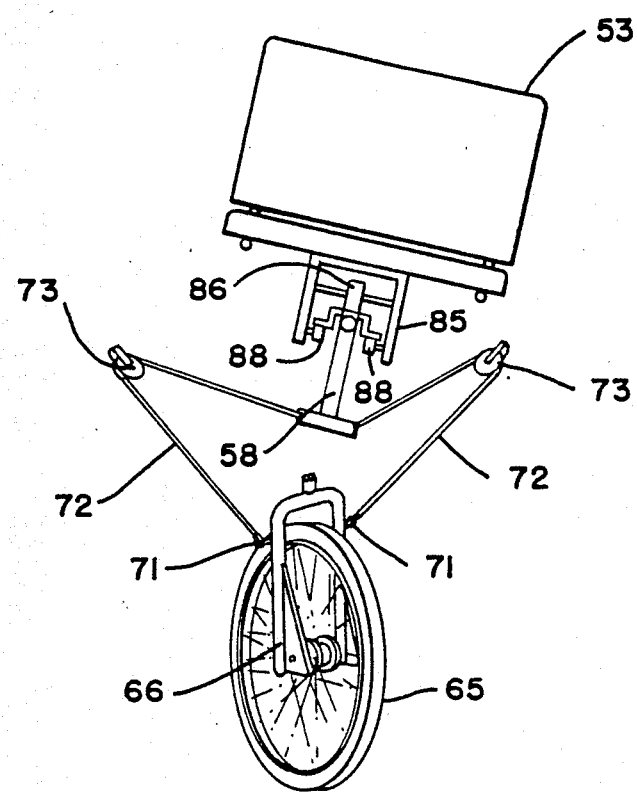
FIG_3
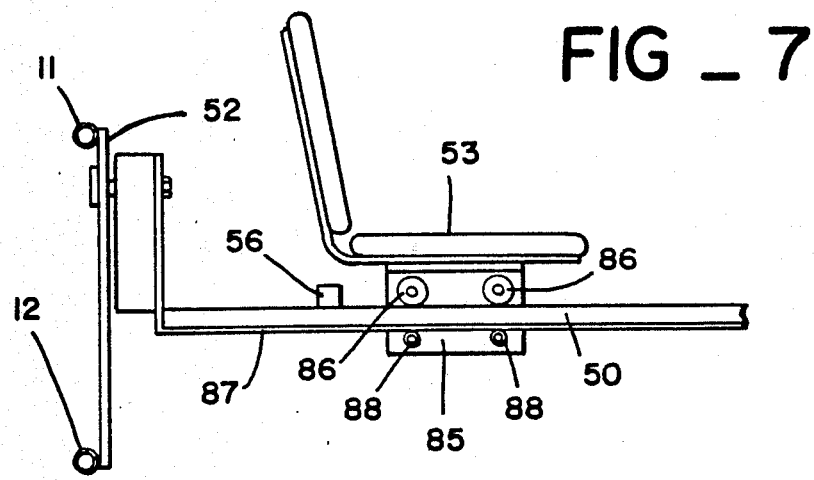
FIG_7

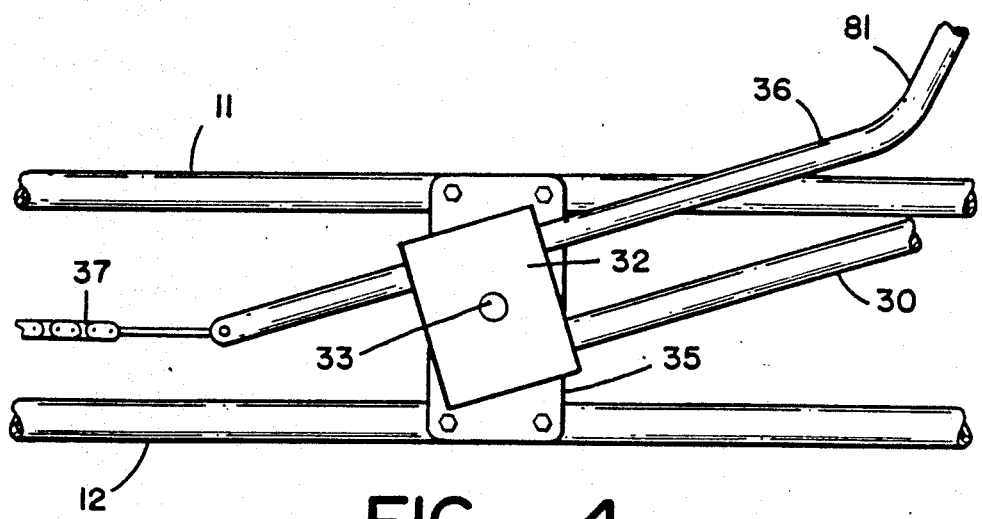
FIG _ 4
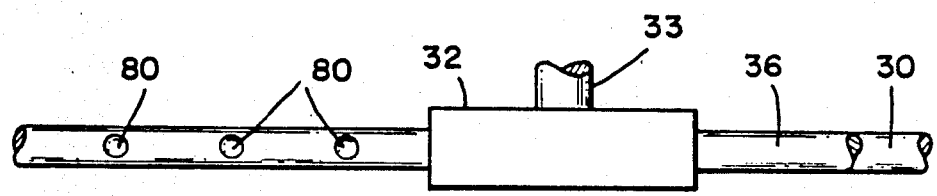
FIG _ 5
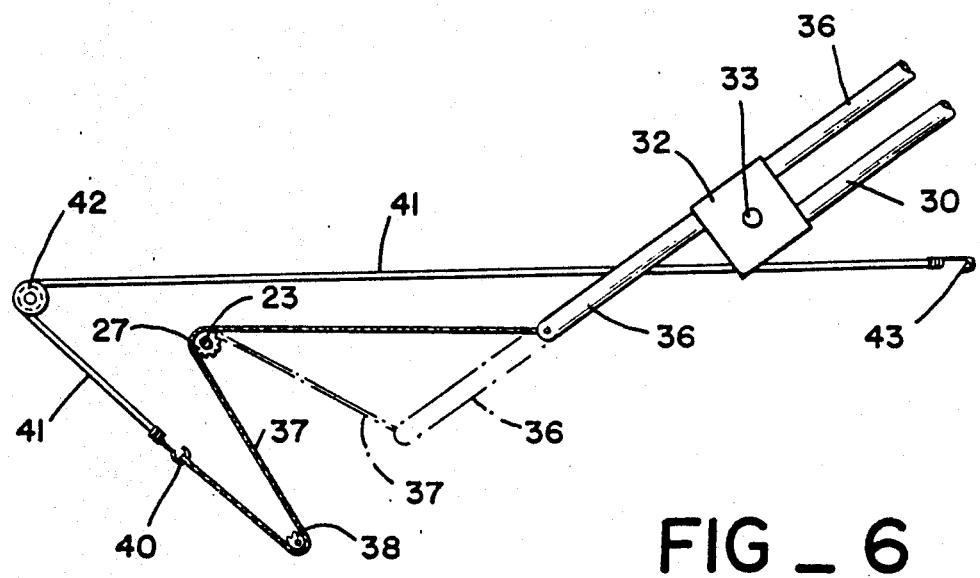
FIG _ 6

ROWING TYPE VEHICLE

TECHNICAL FIELD

This invention is in the field of devices for exercise or for transportation for persons who cannot use their legs.

BACKGROUND ART

Rowing machines are used for exercise. They are made to simulate the motion one uses to row a boat. Rowing machines consist of a frame which is supported on the floor and upon which a seat that rides on a rail between a forward position and a backward position is mounted. Rowing machines have two simulated oar handles which can be pushed forward easily but must be pulled back against a resisting force. Although rowing machines provide excellent exercise for many muscles including legs, arms, back, shoulders and stomach they are not used consistently because the exercise is so boring.

Paraplegics and other persons with disabled legs use wheelchairs to move about. Wheelchairs are normally propelled by a propelling rim attached to the spokes of the wheels. The rims are positioned to be moved by grasping them and thrusting the arms forward. The propelling rims normally are smaller than the diameter of the wheels so that some mechanical advantage is obtained but it is not variable. Thus, whether propelling a wheelchair uphill, downhill or on a flat surface, a given motion of the user's arms and hands will produce the same amount of forward motion of the wheelchair. Wheelchairs are generally very slow moving and even those wheelchairs known to the art that have some variable mechanical advantage generally have only two or three speeds. Shifting between different speeds is usually accomplished in a manner analogous to multiple speed bicycles, specifically, shifting is accomplished by moving a drive chain between different sprockets.

DISCLOSURE OF THE INVENTION

The device of this invention is a vehicle in the nature of a rowing machine but one that can be used outdoors on streets or sidewalks instead of standing on a stationery frame. The device is propelled by rowing motions which may involve the muscles of the legs, torso, back, shoulders and arms, or it can be propelled by motion of the arms alone.

The device of this invention has means to produce a variable mechanical advantage which may vary among a number of preset positions or it may be infinitely variable between a maximum and a minimum position.

The device of this invention is steered without the use of the user's arms or the legs. It is steered by motions changing the attitude of the user's body with respect to horizontal, those motions being the natural motions one would use to compensate for the centrifugal force created by turning the vehicle.

The device of the invention, accordingly, may be propelled by rowing motions to produce high torque and low speed as when going uphill, to produce high speed and low torque as when operating on a flat or downhill surface, to involve all of the muscles normally used in rowing, and to be steered by the operator leaning to one side or another whereby neither the hands nor the feet are rendered inoperative for propelling the vehicle during steering. The vehicle of this invention can be made to easily achieve speeds in excess of fifteen miles per hour while still being able to ascend relatively steep grades. Shifting between high torque and high speed operating positions is accomplished without changing gears or sprockets but by simple motions involving sliding a rod through a cylindrical channel to any position or to any of a number of preselected positions, or to any position of an infinite number of intermediate positions between maximum and minimum torque.

BRIEF DESCRIPTION OF THE DRAWINGS

FIG. 3 is a partial front view from an angle above horizontal illustrating only those portions of the device illustrated in FIG. 1 that are involved in steering.

FIG. 4 is a partial side view illustrating an enlarged view of the propelling handle illustrated in FIG. 1.

FIG. 5 is a partial enlarged view of the extendable rod portion of the propelling mechanism of the device illustrated in FIG. 1.

FIG. 6 is a partial side view illustrating only those elements of the device of FIG. 1 that are employed to engage the driving sprocket.

FIG. 7 is an enlarged view of a portion of the seat and rail assembly illustrated in FIG. 1.

BEST MODE FOR CARRYING OUT THE INVENTION

Figure 1:
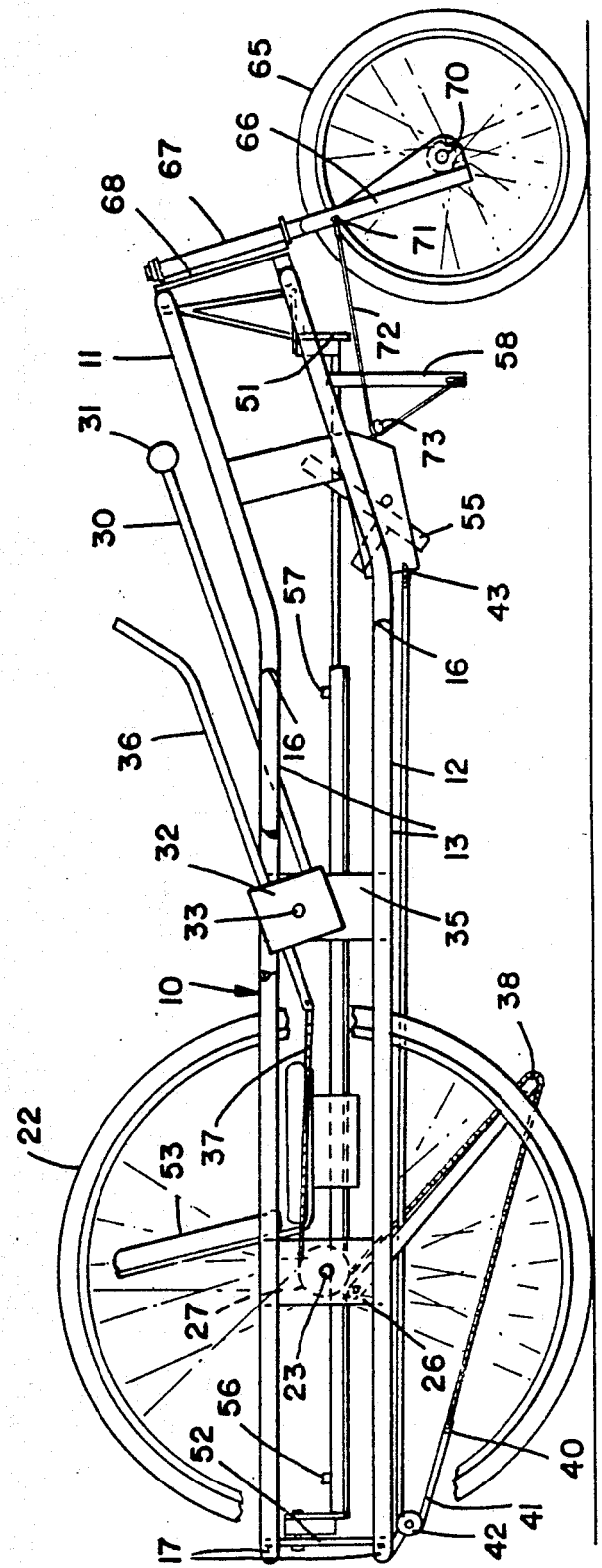
FIG. 1 is a side view of a vehicle embodying this invention.

The device of this invention includes a frame generally designated 10 which is preferably constructed of aluminum tubing. The frame is symmetrical about a long frame axis, which is the axis of symmetry in plan view. The frame includes upper elements 11 and lower elements 12 as well as outer elements 13 and inner elements 15. The outer and inner elements joint, for example by being welded, at the position 16. The frame elements preferably are joined across the back with elements 17 which blend with rounded corners into outer elements 13. The inner elements 15 join at the forwardmost portion of the vehicle, and in fact both the right side and the left side of inner elements 15 may be formed from the same pieces of tubing.

Drive wheels 22 are mounted on an axle 23 that is fastened in bearings in plates 25 and 26 between the upper and lower frame elements. Each axle 23 supports a drive wheel 22 and it includes a drive means 27 illustrated here as a sprocket 27 which includes a ratchet, the ratchet not being illustrated. The ratchet and sprocket arrangement is constructed in a known manner so that when the sprocket turns in a manner to turn the drive wheel 22 illustrated in FIG. 1 in a clockwise direction the ratchet will be engaged while when the sprocket is turned in the counterclockwise direction the ratchet will become disengaged. In other words, the vehicle will be able to coast when not being propelled by the action of the ratchet, all as is known to the art.

The vehicle is propelled by operating handles 30 which are arranged with end portions 31 that are shaped and padded to be easily grasped by one operating the vehicle. The end portions 31 will normally be equipped with levers that operate caliper brakes against the rims of the wheels. The caliper brakes and their operating levers and cables are conventional and are not shown to avoid unduly complicating the illustrated embodiment. The operating handles are fixed in cylindrical passageways in pivoted blocks 32. The pivoted blocks are held to frame 10 by axles 33 fixed within fastening plates 35. The length of operating handles 30 are therefore fixed so that end portions 31 are always in the same position with respect to an operator using the device of this invention.

Pivoted blocks 32 also hold extendible rods 36 which fit within cylindrical passageways within blocks 32 and are axially moveable among a number of preset positions as illustrated in FIGS. 4, 5 and 6. The bottom portions of rods 36 are connected to drive chains 37 which are partially wrapped around sprockets 27, then around pulleys 38. The ends 40 of the chains are connected to resilient means such as springs or bungee cords 41 which in turn wrap around pulleys 42 and are ultimately connected to the frame at points 43.

Figure 2:
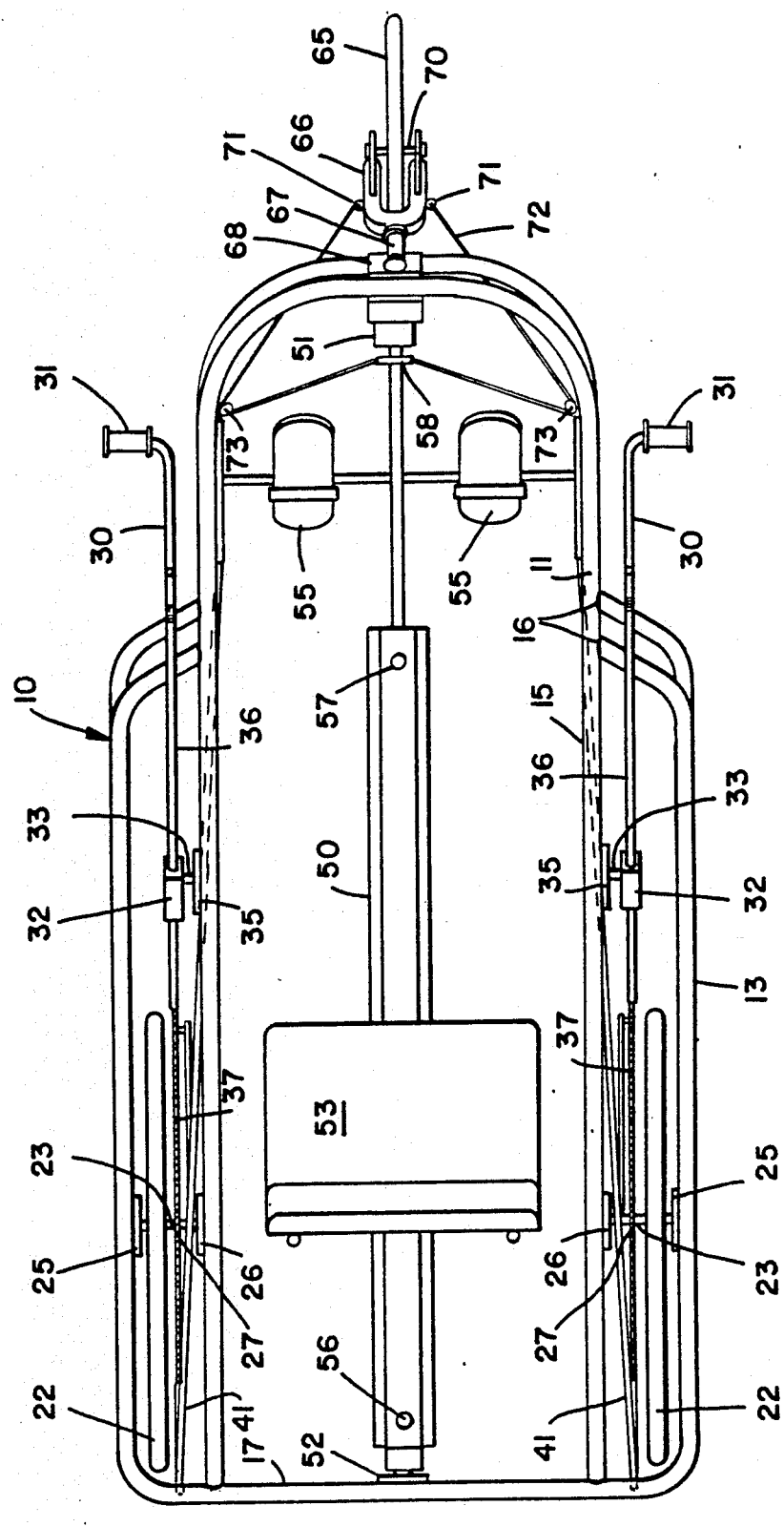
FIG. 2 is a top view of the vehicle illustrated in FIG. 1.

A rail 50 is mounted on the vertical plane of symmetry of the device of this invention as illustrated in FIG. 2. The rail 50 is pivotally mounted between a front mounting plate 51 and a rear mounting plate 52, mounting plates 51 and 52 being attached to the frame by suitable means. The line passing through the pivoted mounts defines the rail axis. As best illustrated in FIG. 7 the rail 50 is preferably mounted so that it hangs beneath the pivotal connections to plates 51 and 52 whereby when the vehicle of this invention is in its normal operating position the rail will seek stable orientation vertically beneath the pivot points. This mounting of the rail will cause steering motions to swing through an arc rather than pivot around a point which will further stabilize the seat. The rail 50 has a seat 53 mounted on it as is best illustrated in FIG. 3 so that seat 53 can roll longitudinally along the rail 50. Foot supports 55 are mounted on the frame toward the forward portion of the vehicle. Foot supports 55 will normally have means associated with them to engage the user's feet, such as straps or clamps, so that the user's legs can cause seat 53 to ride forward and backward along the rail 50. The means to hold a user's feet are not shown. Supports 55 may be adjustable to occupy different positions axially on the frame to accommodate for the length of a user's legs. The rail 50 is illustrated as having a stop 56 to limit the rearward motion of seat 53 and a stop 57 to limit the forward motion. It may have stops to hold it in a single position to adopt the vehicle for use by one who has no use of his legs. Rail 50 also includes a steering arm 58 the function of which will be described in greater detail below.

The illustrated embodiment of this invention also includes a front wheel 65 which is the steering wheel. Front wheel 65 is held between the two tines of fork 66 and it is connected to the frame via a bearing element 67 which is fastened to plate 68. An axle 70 extends through the bearings of wheel 65 in the manner known to the art so that wheel 65 can rotate on axle 70 and it can be turned in bearing element 67 to effect steering of the vehicle. Fastening elements 71 are connected to fork 66 and the fastening elements are in turn connected to cables 72 which go around pulleys 73 and connect to steering arm 58. When the operator of the vehicle tips seat 53 in the direction shown in FIG. 3 the steering arm 58 moves in the direction opposite of the user's body and operates cable 72 through pulleys 73 to cause the wheel 65 to turn out of the line of travel of the vehicle. As illustrated in FIG. 3 if the vehicle is turning toward the right, as viewed, centrifugal force would push the operator toward the left and the operator would lean into the turn. As can be seen in FIG. 3 the motion of leaning into the turn causes wheel 65 to rotate within its bearing element 67 to cause a turn in that direction without requiring use of the operator's hands or feet.

In use, the events causing the vehicle to turn do not happen serially. A single natural motion on the part of the operator both prepares the operator to brace against the turn and effects the turn so that the preparation for and the turn of the vehicle occur simultaneously, much in the manner of turning a bicycle. While the vehicle is being turned the operator's feet remain on the foot platforms and the operator's body continues the same rowing motion that is used during operation when a turn is not being made.

FIG. 4 shows an enlarged view of one of the operating handles 30 and the extendible rods 36. Pivoted block 32 operates on an axle 33 that is fixed to plate 35 which in turn is fastened between frame members 11 and 12. Block 32 contains two passageways through it neither of which is shown. Operating handle 30 is fixed in one of the passageways so that it is not moveable with respect to block 32. Accordingly, the end portions 31 of handle 30 are always the same distance from block 32 and always occupy the same rotational position with respect to the passageway in which operating handle 30 is fixed.

Extendible rod 36, on the other hand, is slidable within block 32 so it can be rotated within its passageway as well as being moved axially as shown in FIG. 5. In the illustrated embodiment extendible rod 36 includes a number of indentations or dimples 80 which interact with a spring-loaded ball within the passageway in block 32 through which extendible rod 36 passes. This is a familiar detent apparatus for releasably locking elements together in preset positions. The rod is locked axially when the detent ball is engaged in a dimple 80. The curved end 81 of extendible rod 36 is useful both to provide leverage for twisting rod 36 to disengage the detent ball from a dimple 80 when it is desired to axially move rod 36 within its passageway and it is useful to gauge the position of dimples 80 and to make the operator aware of when they are aligned with the detent means within the passageway. As illustrated in FIG. 5 the device of the invention may have at least three or four speeds by locking the detent means in any of a number of dimples.

As illustrated in FIG. 6, as rod 36 is moved the gear ratio of the vehicle changes. In the solid line illustration rod 36 is in low gear, positioned to provide a high-torque and low-speed operation of the vehicle. As illustrated in solid lines, moving operating handle 30 through a large arc will cause the end of rod 36 to move through a small arc. However, if rod 36 is moved to the position illustrated in broken lines, then movement of operating handle 30 through that same arc will cause the end of extendible rod 36 to move through a much longer arc thereby effecting more rotation of the wheel 22 as a result of stroke of the same length. Although rod 36 is illustrated with three or four preset positions, means may be employed within block 32 to provide infinite variation between the maximum and minimum settings of rod 36. One such arrangement is a rounded rod having a rack that has teeth to engage with teeth within block 32, the rod having a flat side that permits it to slide within block 32 when the flat side is confronting the teeth within the block.

In the drive mechanism illustrated in FIG. 6 the drive chain 37 is connected to the end of extendible rod 36 and passes around sprocket 27 and around idler wheel 38 whereupon it connects at point 40 to a bunge cord 41. Bunge cord 41 passes around pulley 42 and connects at point 43 to the frame 10. The bunge cord 41 performs two functions. One function is to take up the slack in chain 37 regardless of whether extendible rod 36 is in its most extended position or in its most retracted position. The other function is to keep chain 37 under tension so that it does not become disengaged from sprocket 27 during the return stroke of operating handle 30.

FIGS. 3 and 7 illustrate how the seat of the illustrated embodiment rides on rail 50. The seat 53 is mounted on a bracket 85 which is in the shape of an inverted U. The bracket 85 has bearings, not shown, for mounting axles to support wheels 86. The rail 50 has two flange portions 87 which are also bracketed by seat bracket 85. Wheels 88 are mounted on shafts supported by bracket 85 and they ride under the flange portions 87. This arrangement permits seat 53 to move forward and backward axially along rail 50 on rollers or wheels 86 but to be firmly held to rail 50 by wheels 88. The arrangement also provides for tilting seat 53 along with its supporting rail 50 to effect steering without having the seat become unstable with regard to its supporting rail 50.

APPLICABILITY

To use the device of this invention an operator steps into the frame facing the front wheel 65 and straddling rail 50. The operator sits on seat 53 and fastens his feet to supports 55. The operator then adjusts both rods 36 to the same mechanical advantage position and propels the vehicle with rowing motions of handles 30. If greater speed is desired rods 36 are moved downwardly and if greater torque is desired rods 36 are moved upwardly. Steering is effected by leaning in the direction of the desired turn. In the illustrated embodiment the rearward position of seat 53 is located to permit an operator to perform "wheelies" by thrusting his weight backward to put his center of gravity behind axles 23 whereupon the front wheel 65 comes off of the supporting surface. With front wheel 65 above the road very sharp turns can be effected, for example by operating one handle 30 and applying the brake on the other wheel. Skilled operators can also make sharp turns by using handles and brakes in conjunction with tilting the seat. The device lends itself to such techniques which makes it particularly useful in athletic events for handicapped persons.

What is claimed is:

1. A rider propelled vehicle comprising a frame having a frame axis parallel to the direction of travel of said vehicle, a drive wheel including driving means mounted on said frame to rotate on an axle perpendicular to said frame axis, a steerable wheel having an axis of rotation, said steerable wheel mounted on said frame in bearing means defining a steering axis of said steerable wheel with respect to said frame axis, a rail pivotally mounted on said frame to rotate around a rail axis with said rail axis parallel with said frame axis, said rail having a seat mounted thereon, and enlongated operating handle mounted on said frame through pivoting means to move reciprocally through a power stroke and a return stroke, said handle having an upper end and a lower end with said lower end fixed in said pivoting means, an extendible rod slidably mounted in releasable locking means within said pivoting means whereby angular motion of said handle produces corresponding angular motion of said extendible rod, elongated flexible means engaged with said driving means, said elongated means connected at one end to said extendible rod and at the other end to biasing means positioned to bias said handle through said return stroke whereby varying the position of said rod in said pivoting means varies the mechanical force exerted on said driving means through said elongated means during said power stroke, and means connected between said rail and said steerable wheel to move said steerable wheel around its steering axis responsive to rotation of said rail around said rail axis of rotation.

2. The vehicle of claim 1 having two drive wheels.

3. The vehicle of claim 1 having foot platforms mounted on said frame.

4. The vehicle of claim 1 having said rail located below said rail axis when said vehicle is in its normal operating position.

5. The vehicle of claim 1 wherein said seat is moveable axially along said rail.

6. The vehicle of claim 5 wherein said rail includes front and rear stops to restrict the forward and backward motion of said seat.

7. The vehicle of claim 6 wherein said rear stop is positioned to stop said seat behind the axle of said drive wheel.

8. The vehicle of claim 1 including two operating handles with grasping end portions extending at an angle from the longitudinal axis of said operating handles.

9. The vehicle of claim 1 wherein said extendable rod includes a plurality of preset locked positions within said pivoting means.

10. The device of claim 1 wherein said driving means includes a sprocket and a ratchet.

11. The vehicle of claim 1 wherein said elongated drive means is a chain.

* * * * *